Patented Apr. 29, 1930

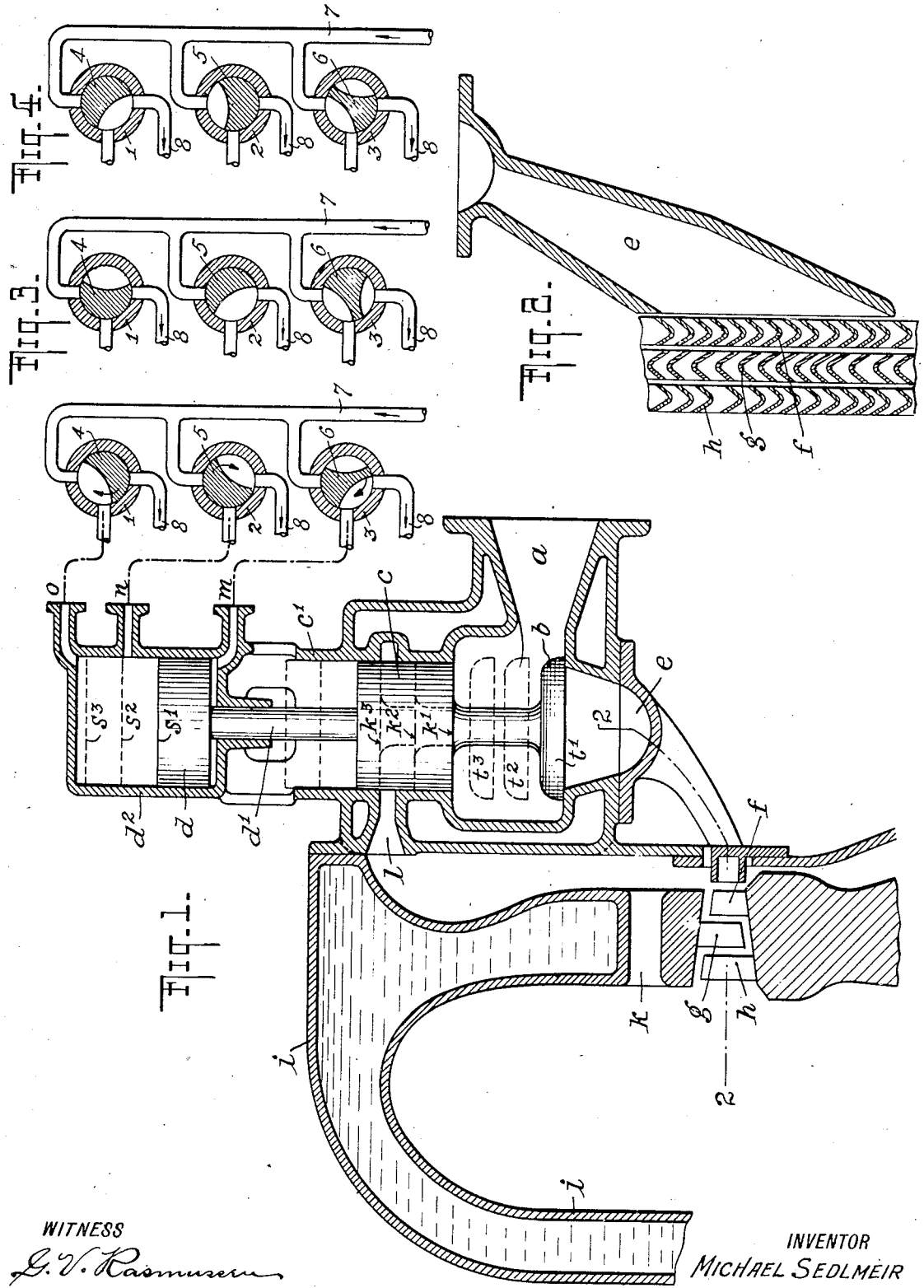

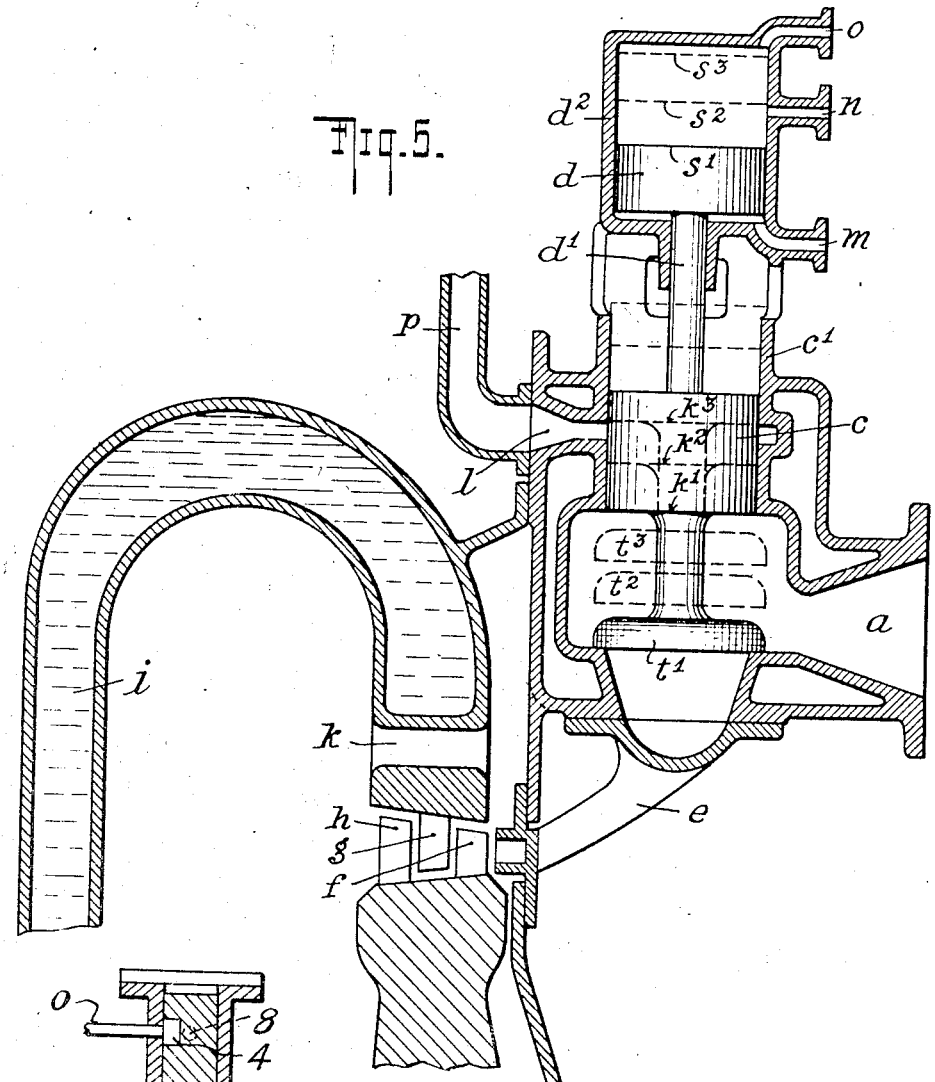
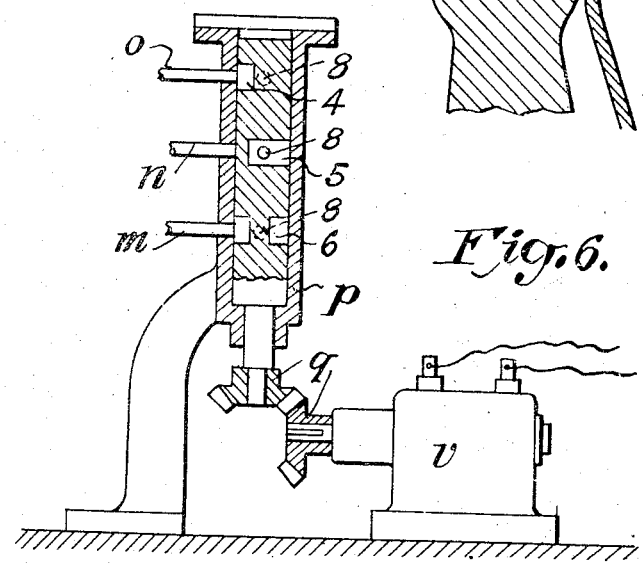

1,756,139

UNITED STATES PATENT OFFICE

MICHAEL SEDLMEIR, OF MULHEIM-RUHR, GERMANY, ASSIGNOR TO HOLZWARTH GAS TURBINE CO., OF SAN FRANCISCO, CALIFORNIA, A CORPORATION OF DELAWARE

NOZZLE-VALVE CONSTRUCTION FOR COMBUSTION TURBINES

Application filed June 22, 1927. Serial No. 200,741.

The present invention relates to combustion turbines in which ignition of a mixture of air and combustible gases in a combustion chamber under constant volume produces a high pressure gaseous operating medium which, through the medium of a nozzle valve and an expansion nozzle, is directed against the blades or buckets of the turbine wheel. As a subsequent step in the operation of such turbines, scavenging air is passed through the combustion chamber whereby a cooling of the chamber, the nozzle, and the turbine wheel, is effected and at the same time the combustion chamber is filled with fresh air and a new explosive mixture.

In such combustion turbines the smallest cross sectional dimension of the expansion nozzle is designed with particular reference to the highest developed presssure in order that the pressure energy may be transformed into driving energy in a manner to provide the most favorable operative efficiency under the most favorable temperature conditions. This cross sectional dimension of said nozzle is, however, too small for the scavenging operation which follows the expansion step when operating under a low scavenging pressure and with a relatively short scavenging period. It is desirable to reduce the latter period as much as possible in order that in a given operative cycle the greatest number of operative steps may be included to thereby increase the operative efficiency of the turbine without requiring an undue enlargement thereof. For the purpose of obtaining this advantage it has previously been proposed to include in the turbine an additional valve, operating as an exhaust valve, which opens immediately after explosion of the explosive mixture has taken place and closes before a subsequent explosion occurs. Such an additional exhaust valve, which generally is arranged adjacent to the nozzle valve and is independently operated, results, however, in complicating the construction of the turbine and adversely influences the form and dimensions of those operative parts which are most important. The object of the present invention is to overcome the existing disadvantages and to solve the problem of providing a larger cross section for the scavenging period by providing a combined nozzle and exhaust valve controlling the nozzle inlet and also an auxiliary passage in such manner that, when said combined valve is raised, communication is established first between the combustion chamber and the nozzle for the discharge of the explosion gases to the turbine, and then communication is additionally established with the auxiliary passage, whereby the nozzle inlet and the auxiliary passage are opened in timed relation, the periods during which they remain open overlapping during the scavenging period, thereby temporarily affording an outlet of larger cross-section for the scavenging air. Other more specific objects will appear from the description hereinafter and the features of novelty will be pointed out in the claims.

In the accompanying drawings, which illustrate examples of the invention without defining its limits, Fig. 1 is a diagrammatic fragmentary section through the nozzle, nozzle valve, turbine wheel, and exhaust chamber of a combustion turbine provided with the novel features; Fig. 2 is a tangential section through the blades of the turbine wheel and the nozzle on the line 2—2 of Fig. 1; Figs. 3 and 4 illustrate the control elements in various successive positions; Fig. 5 is a view similar to Fig. 1 illustrating another arrangement of the invention; and Fig. 6 is a view in elevation, partly in section, of a unitary construction for the control elements.

In the drawings $a$ is the nozzle valve casing which, in practice, communicates with the combustion chamber (not shown) of the turbine and contains the nozzle valve $b$ whereby communication between the nozzle casing $a$ and the nozzle $e$ is controlled. The latter terminates in close proximity to and is directed toward the turbine wheel provided with the rotor blades $f$ and $h$ between which the stator blades $g$ are arranged in fixed location in the customary manner, said turbine wheel and stator blades being mounted in a water cooled and exhaust chamber $i$. As shown in Fig. 2 the nozzle $e$ diverges interiorly toward the aforesaid blades and is of smallest cross section in proximity to the nozzle valve $b$ and from this point increases in cross sectional dimension to its largest size adjacent to the blades referred to. The nozzle valve $b$ is rigidly connected with an exhaust piston $c$ mounted to reciprocate in a casing $c'$ which is connected by means of an exhaust conduit or passage $l$ with the interior of the exhaust chamber $i$. The exhaust piston $c$ in turn is rigidly connected by means of a stem $d'$ with a control piston $d$, the latter being slidably mounted within a cylinder $d^2$. The nozzle valve $b$ is capable of assuming three different positions of which the lowest and closed position is shown by full lines in the drawings and the other two positions by dotted lines; the three positions of the lower edge of the valve $b$ are indicated in Fig. 1 as $t'$, $t^2$ and $t^3$, the corresponding three positions of the lower edge of the exhaust piston $c$ are indicated as $k'$, $k^2$ and $k^3$ while the three corresponding positions of the upper edge of the controlling piston $d$ are designated at $s'$, $s^2$ and $s^3$.

Immediately after an explosion has taken place in the combustion chamber in the conventional manner, the valve $b$ is raised from its lowest position $t'$ to the intermediate position $t^2$ in which the nozzle $e$ alone is brought into communication with the combustion chamber, the exhaust opening $l$ at this stage being still covered by the exhaust piston $c$ which, by the aforesaid movement of the valve $b$, has been shifted to the position $k^2$. The products of the explosion accordingly pass through the nozzle $e$ and by operating against the blades $f$, $g$ and $h$ cause the turbine wheel to be rotated in the well known manner. As expansion of the products of explosion takes place, the valve $b$ will finally be raised to its highest position $t^3$ in which the lower edge of the piston $c$ is located in the position $k^3$ so that at this stage the exhaust opening $l$ is uncovered and accordingly communicates with the interior of the casing $a$. The exhaust gases of the combustion chamber and the scavenging air which follows accordingly pass through the nozzle $e$, and also through the opening $l$ and through the channel $k$ to the exhaust casing $i$ of the turbine. In other words, in addition to availing themselves of the passage through the nozzle $e$, the exhaust gases and the scavenging air in this position of the parts also avail themselves of the opening $l$ in their passage into the exhaust casing, the aforesaid opening $l$ accordingly providing a temporary addition to the relatively narrow nozzle passage and thereby in effect providing a passage of enlarged size for the accommodation of the exhaust gases and the scavenging air which follows. In effect, therefore, the arrangement provides temporarily a conduit of enlarged dimensions for the scavenging air during the scavenging periods.

The control of the nozzle valve $b$ and the exhaust piston $c$ to bring about the aforesaid conditions, may be accomplished in various ways, it being of advantage, however, to use a non-elastic pressure fluid and especially oil under pressure as the control medium. As shown in Fig. 1 the casing $d^2$ may accordingly be provided with three connections $m$, $n$ and $o$ which communicate by means of pipes with the oil distributor or controlling apparatus; for the sake of simplicity the elements whereby the control oil is distributed are diagrammatically illustrated as individual valve cocks 4, 5 and 6 rotatably located in casings 1, 2 and 3 communicating respectively with the connections $o$, $n$ and $m$ and with the oil supply pipe 7 and each having an oil outlet 8. When the nozzle valve $b$ occupies its lowest position as shown in Fig. 1 the valve cocks 4, 5 and 6 will occupy the positions shown in said figure in which the connection $o$ is in communication with the oil supply pipe 7 while the connection $m$ is in communication with the outlet 8; at the same time the connection $n$ is closed. The control piston $d$ is accordingly forced downward by the pressure of the oil in the casing $d^2$ above said piston whereby the valve $b$ is maintained upon its seat to close the communication between the combustion chamber and the nozzle $e$ and the exhaust opening $l$ is also closed. After the valve cocks 4, 5 and 6 have been rotated through predetermined arcs in a clockwise direction, the position illustrated in Fig. 3 is reached. In this adjustment of the parts the connection $m$ is in communication with the oil supply pipe 7 while the connection $n$ is in open communication with the outlet 8 and the connection $o$ is closed. At this stage, oil is admitted into the casing $d^2$ beneath the piston $d$ which accordingly is forced to its intermediate position $s^2$ but cannot go further because the connection $o$ is closed and the oil which is trapped between the piston and the upper end of the casing $d^2$ interposes a resistance to any further upward movement of said piston $d$. After a further rotation of the cocks 4, 5 and 6 through a predetermined arc, the position shown in Fig. 4 is reached in which the connection $m$ is still in communication with the supply pipe 7 while the connection $o$ is now in open communication with the outlet 8 and the connection $n$ is closed; the resistance of the aforesaid trapped oil above the piston $d$ being now relieved, the latter is capable of being forced to its highest position by the pressure of the oil beneath said piston $d$. Obviously as the piston $d$ is actuated in the manner set forth the exhaust piston $e$ and the nozzle valve $b$ will be correspondingly actuated, it being noted, however, that the exhaust opening $l$ is opened later than the opening movement of the nozzle valve $b$. As the operation of the turbine continues, the aforesaid operative steps are repeated in successive cycles throughout any given operative period of the turbine.

Inasmuch as the three valve cocks 4, 5 and 6 move through corresponding arcs they may, in practice, all be located in any conventional way upon a common axis and combined in the form of a rotating control element of the control apparatus as illustrated in Fig. 6 wherein the three cocks 4, 5 and 6 are shown combined in the form of an integral revoluble member arranged within a housing $p$. The revoluble member may be driven, as by means of the bevel gears $q$, from the shaft of a motor $v$ or from the turbine shaft.

In the form shown in Fig. 5 the exhaust from the passage $l$ instead of being passed into the casing $i$ is passed through a special exhaust pipe $p$ separate from the said exhaust casing as illustrated. This arrangement has the advantage that no scavenging air flows into the exhaust casing as such air encounters a greater resistance against the rapidly rotating blades of the turbine wheel than in the exhaust pipe $k$ and accordingly travels over the path of least resistance through said exhaust pipe.

With this arrangement the expanded combustion gases in the exhaust casing are not cooled by contact with the scavenging air and accordingly retain a higher temperature, which has the advantage that the heat may be efficiently utilized with a reduction in the heat conducting surfaces. The separation of the scavenging air from the exhaust gases has the further advantage that recovery of nitrous acid from the separated exhaust gases is accomplished more easily and with greater efficiency.

Various changes in the specific form shown and described may be made within the scope of the claims without departing from the spirit of the invention.

I claim:

1. In an explosion turbine, the combination of a nozzle, a nozzle conduit for conducting explosion gases from an explosion chamber to said nozzle, an outlet conduit adapted to be placed in communication with said nozzle conduit to form an auxiliary exhaust passage for the gases issuing from the explosion chamber of said turbine during the scavenging period, a nozzle valve, an outlet valve for controlling said outlet conduit, and means for opening said valve, the latter being connected and so disposed relatively to each other that the outlet conduit is opened after the nozzle conduit.

2. In an explosion turbine, the combination of an explosion chamber wherein a charge of fuel and air is adapted to be exploded under constant volume, a nozzle forming an exhaust passage for the combustion gases generated in said chamber, an outlet conduit adapted to form an auxiliary exhaust passage for gases issuing from said explosion chamber, a nozzle valve controlling said first-mentioned exhaust passage, an outlet valve for controlling said outlet conduit arranged in axial alignment with said nozzle valve and rigidly connected therewith, and means operatively associated with said valves and operable to open the nozzle valve and the outlet valve one directly after the other, the nozzle valve opening before said outlet valve.

3. In an explosion turbine, the combination of an explosion chamber wherein a charge of fuel and air is adapted to be exploded under constant volume, a nozzle forming an exhaust passage for the combustion gases generated in said chamber, an outlet conduit adapted to form an auxiliary exhaust passage for gases issuing from said explosion chamber, a nozzle valve controlling said first-mentioned exhaust passage, an exhaust piston valve connected with said nozzle valve for controlling said conduit, and means for opening the nozzle valve and the exhaust piston valve, said nozzle valve opening before said piston valve.

4. In an explosion turbine, the combination of an explosion chamber wherein a charge of fuel and air is adapted to be exploded under constant volume, a nozzle forming an exhaust passage for the combustion gases generated in said chamber, an outlet conduit adapted to form an auxiliary exhaust passage for gases issuing from said explosion chamber, a nozzle valve controlling said first-mentioned exhaust passage, an exhaust piston valve connected with said nozzle valve for controlling said conduit, a control piston connected to said valves and adapted to be raised by fluid pressure to lift said valves, the nozzle and conduit being so related with respect to their respective valves that the nozzle valve opens before the piston valve, and means for restoring the control piston when the fluid pressure beneath the same is relieved.

5. In an explosion turbine, the combination of an explosion chamber, wherein a charge of fuel and air is adapted to be exploded under constant volume, a nozzle forming an exhaust passage for the combustion gases generated in said chamber, an outlet conduit adapted to form an auxiliary exhaust passage for gases issuing from said explosion chamber, a nozzle valve controlling said first-mentioned exhaust passage, an exhaust piston valve rigidly connected with said nozzle valve and controlling said conduit, said piston valve being of such length as to be capable of considerable movement before opening said conduit, a control piston connected with said valves, a casing in which said control piston is slidably mounted, connections leading from the lower and upper ends of said casing and from an intermediate point thereof, and means whereby said connections are brought into communication with a source of oil under pressure and with oil outlets in a manner to raise said piston to open the nozzle valve and thereafter the piston valve, and subsequently to restore the parts to their initial positions.

In testimony whereof I have hereunto set my hand.

MICHAEL SEDLMEIR.